(No Model.)
J. STODDARD.
LUBRICATING DEVICE FOR REVOLVING BODIES.
No. 594,183. Patented Nov. 23, 1897.
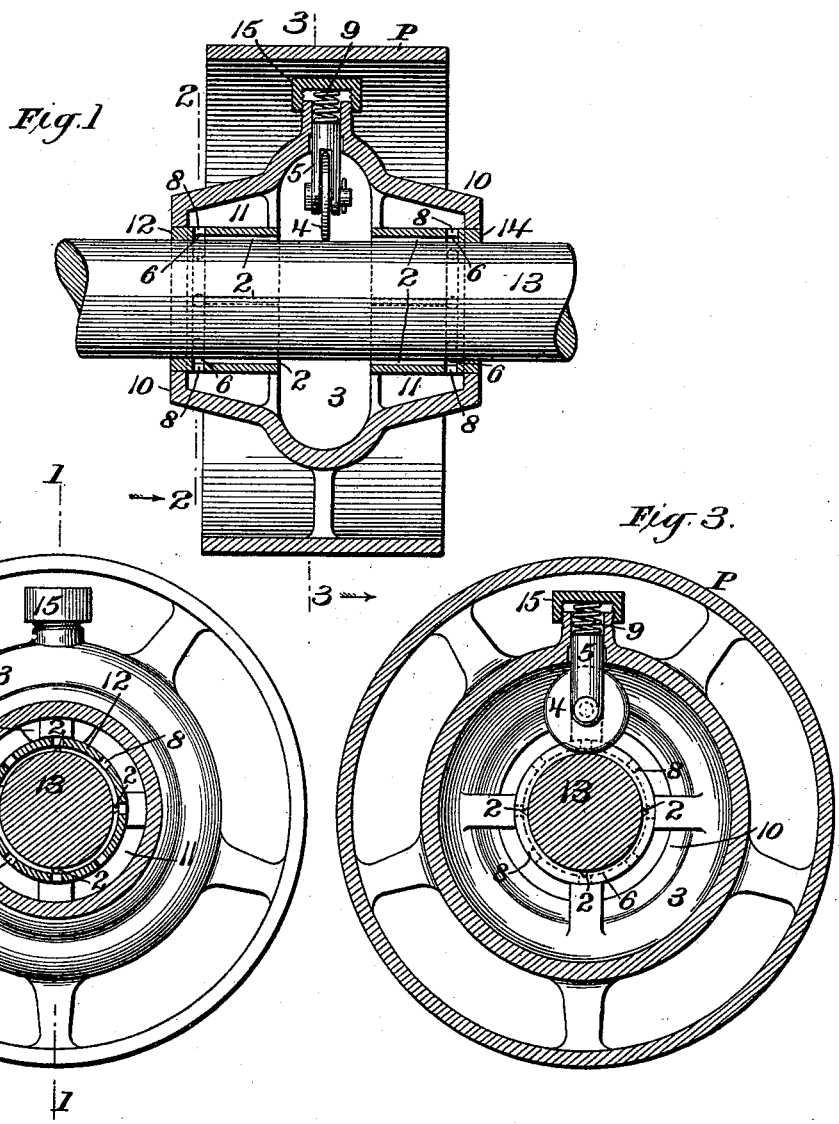
Attest:
Geo. H. Bitty
J. F. Kehoe
Inventor
John Stoddard
by Phelps Munson & Phelps
Attys

UNITED STATES PATENT OFFICE.

JOHN STODDARD, OF WILMINGTON, DELAWARE.

LUBRICATING DEVICE FOR REVOLVING BODIES.

SPECIFICATION forming part of Letters Patent No. 594,183, dated November 23, 1897.

Application filed December 5, 1896. Serial No. 614,532. (No model.)

*To all whom it may concern:*

Be it known that I, JOHN STODDARD, a citizen of the United States, residing at Wilmington, county of New Castle, and State of Delaware, have invented certain new and useful Improvements in Lubricating Devices for Revolving Bodies, fully described and represented in the following specification and the accompanying drawings, forming a part of the same.

It is the object of this invention to provide pulleys, fly-wheels, drums, and other bodies revolving on shafts or whose shafts revolve in bearings with means for constantly applying lubrication to the contacting surfaces while said bodies are rotating.

The invention consists in providing such revolving bodies with a reservoir for the lubricant and means for constantly transferring the same to the bearing parts. It also includes particular structures embodying the invention, all of which are hereinafter fully described and claimed.

Practical embodiments of this invention are illustrated in the accompanying drawings, in which—

Figure 1 is a longitudinal sectional elevation of a pulley capacitated to revolve upon its carrying-shaft, which latter is in elevation. Fig. 2 is a vertical sectional elevation of the same on the line 2 of Fig. 1, the view being taken as seen looking in the direction of its arrow. Fig. 3 is a similar vertical elevation on the line 3 of Fig. 1, the view being taken as seen looking in the direction of its arrow.

As embodied in the construction shown this invention is applied to a pulley P, that is furnished with a hub 10, so enlarged and constructed as to provide it interiorly with a chamber 11. This hub is fast at one end to a bushing consisting of two parts 12 14, which fit the shaft 13 and project inwardly well toward the center of said hub, thus leaving a central space between them within said hub unobstructed where a portion of the shaft is bare. These parts 12 14 of the bushing are provided on their inner surfaces or their bearing portions which come next to the shaft 13 with longitudinal channels 2, which at their inner ends tap the central space where the shaft is bare and at their outer ends terminate in annular recesses 6, which are cut on the inside of said bushings near the outer ends, and which recesses 6 connect with the outside of said bushings by means of holes 8 piercing them. The hub 10 preferably has its outer ends tapered or is constructed so that the walls of its chamber 11 shall spread as the center is approached and form a central circumferential reservoir 3. Within this chamber 3, preferably at a central point thereof, there is provided a small wheel 4, that is pivoted in a pin 5, whose shank is entered in and guided by a circular recess provided in an enlargement at one side of said hub, and in which recess it is arranged to have a slight vertical play which is provided for by the resiliency of a spring 9, upon which it is seated, and which spring is housed in said projection, where it is held by a screw-threaded closing-cap 15, which projection or a similar one may provide the means for the introduction of the oil used as a lubricant into the chamber within said hub.

When the parts are stationary, it is obvious that the oil or other lubricant will descend by gravity and rest in the lower part of the chamber within said hub, and it is equally evident that when rotary motion is imparted to the pulley centrifugal action will cause the oil or lubricant to move outwardly and distribute itself until it is sustained along the inner wall of the reservoir, formed by the most extended or central portion of the hub 10.

The revolution of the pulley about its shaft will simultaneously cause the wheel 4, which is elastically pressed thereon by the spring 9, to revolve on the pin or pivot, and as said wheel 4 is of a diameter that extends its periphery from the surface of the shaft 13 to the body of oil or lubricant sustained in the outermost part of the said reservoir said wheel will either contact with the outer surface of the oil or lubricant or dip therein, and consequently operate to constantly take up a portion of the same, carry it onward upon its periphery, and transfer it to the exterior surface of the shaft 13. The oil thus transferred to and applied around the exterior surface of the shaft will, by the revolution thereof, move laterally thereon, pass through the channels 2 in the bushing, enter the annular recesses 6 therein, and thence move outwardly therefrom through the holes 8 and finally enter the chamber 11 in the hub, whereupon centrifugal action will act to carry it into the reservoir to be again acted upon by the wheel 4 and repeat the course just described. By this means a quantity of oil or other suitable lubricant will be used over and over again and constantly be fed from the accumulating-reservoir to the surface of the shaft and thus keep the same and the parts contacting therewith thoroughly lubricated.

From an understanding of this bushing it will be apparent that instead of being composed of two parts 12 14 the structure may be comprised in a single piece, perforated at the point where the wheel 4 is located, so as to enable the same to penetrate to said shaft and convey the lubricant thereto. When shafts are large, two or even more of these wheels 4 may be used.

The face of the wheel 4, engaging the shaft 13, may be of any suitable width and may, if desired, be provided with small recesses forming cups, which act as conveyers to carry the oil from the reservoir to the shaft.

The structure of parts may widely differ from what is shown and yet embody this invention; but the examples given are sufficient to enable one skilled in the art to adapt this invention in all situations where a rotating member turns on a stationary one.

What is claimed is—

1. A device for lubricating the shafts or bearings of revolving bodies, the same consisting of a revolving reservoir for the lubricant, and a wheel moving with the reservoir the periphery of which wheel engages with the shaft and lubricant and is revolved to carry the lubricant from said reservoir to the shaft, substantially as described.

2. A device for lubricating the shafts or bearings of revolving bodies, the same consisting of a revolving reservoir for the lubricant, and a lubricant-carrying wheel moving with the reservoir the periphery of which wheel projects into said reservoir and runs in engagement with the shaft of the revolving body, and means for holding the wheel yieldingly in contact with the said shaft, substantially as described.

3. A device for lubricating the shafts or bearings of revolving bodies, the same consisting of a reservoir for the lubricant, a bushing on which the outer ends of said reservoir are secured, which bushing turns on the shaft, and a lubricant-carrying wheel held within said reservoir so that its periphery runs in engagement with the shaft, substantially as described.

4. A device for lubricating the shafts or bearings of revolving bodies, the same consisting of a reservoir for the lubricant, a bushing on which the outer ends of said reservoir are secured, which bushing turns on the shaft, a lubricant-carrying wheel held within said reservoir so that its periphery runs in engagement with the shaft, and means for holding the said wheel yieldingly in contact with the shaft, substantially as described.

5. In a device for lubricating the shafts or bearings of revolving bodies, the combination of a reservoir for the lubricant, bushing 12, 14 on the shaft, with which bushing the reservoir revolves on the shaft, said bushing having oil-grooves 2 on its inner surface, and a lubricant-carrying wheel held within said reservoir so that its periphery runs in engagement with the shaft, substantially as described.

6. In a device for lubricating the shafts or bearings of revolving bodies, the combination of a reservoir for the lubricant, bushing 12, 14 on the shaft with which bushing the reservoir revolves on the shaft, said bushing having oil-grooves 2 on its inner surface, and openings 8 connecting said grooves with the reservoir, substantially as described.

In testimony whereof I have hereunto set my hand in the presence of two subscribing witnesses.

JOHN STODDARD.

Witnesses:
J. NEWMAN DAVIS,
HOWELL S. ENGLAND.